R. H. DANZINGER.
AUTOMATIC RATCHET COUPLING.
APPLICATION FILED DEC. 21, 1907.

907,574.

Patented Dec. 22, 1908.

3 SHEETS—SHEET 1.

Witnesses:
H R Weigle
Otto Marsik

Inventor:
Rudolph H. Danzinger
by Robt Klotz
Atty.

THE NORRIS PETERS CO., WASHINGTON, D. C.

R. H. DANZINGER.
AUTOMATIC RATCHET COUPLING.
APPLICATION FILED DEC. 21, 1907.

907,574.

Patented Dec. 22, 1908.

Witnesses.
H. R. Weigle.
Otto Marsik.

Inventor.
Rudolph H. Danzinger
by Robt. Ulot
Atty.

UNITED STATES PATENT OFFICE.

RUDOLPH HEINRICH DANZINGER, OF JOLIET, ILLINOIS.

AUTOMATIC RATCHET-COUPLING.

No. 907,574.  Specification of Letters Patent.  Patented Dec. 22, 1908.

Application filed December 21, 1907. Serial No. 407,562.

*To all whom it may concern:*

Be it known that I, RUDOLPH H. DANZINGER, a citizen of the United States, and a resident of the city of Joliet, in the county of Will and State of Illinois, have invented a new and useful Improvement in Automatic Ratchet-Couplings, of which the following is a complete specification.

This invention relates to improvements in automatic ratchet couplings and more particularly to a coupling by means of which the drive shaft may be revolved in either direction either with or without driving the alined or driven shaft.

Heretofore it has not been possible with the use of a single ratchet coupling or connection to operate the drive shaft in either direction and to permit the alined shaft to either remain idle or to be driven therewith. Furthermore in couplings of this kind the reverse movement is usually attended by more or less noise and wear due to the movement of the pawls into and out of engagement with the ratchet teeth.

The object of this invention is to provide an automatic ratchet coupling adapted to connect the driven shaft with the drive shaft for rotation in either direction, or to permit it to remain idle when the drive shaft is rotated in either direction.

It is also an object of the invention to provide a coupling which, when the drive shaft is reversed and the alined shaft is idle, is practically noiseless and frictionless, and which is also capable of adjustment to hold the pawls from engagement with the ratchet teeth when the drive shaft is driven forwardly, thereby permitting the alined shaft to remain idle.

It is a further object of the invention to provide a coupling of cheap and simple construction adapted to be applied to drive and driven shafts of any description and for any purpose where it is desired to rotate the driven shaft in either direction or to permit it to remain idle while the drive shaft is rotated in either direction.

The invention consists of the matters hereinafter described in the specification and more fully pointed out and defined in the appended claims.

Figures 1, 2:
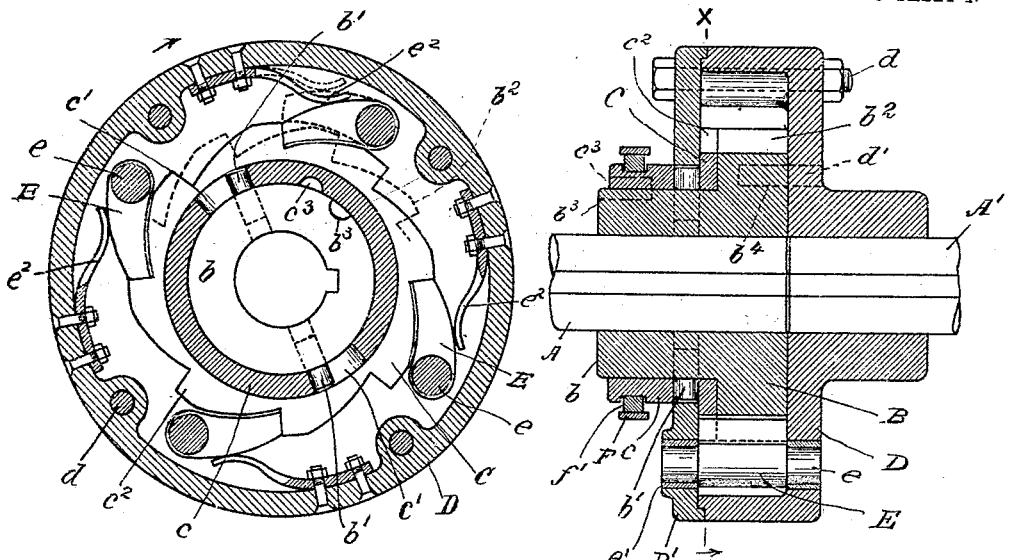
Figure 3:
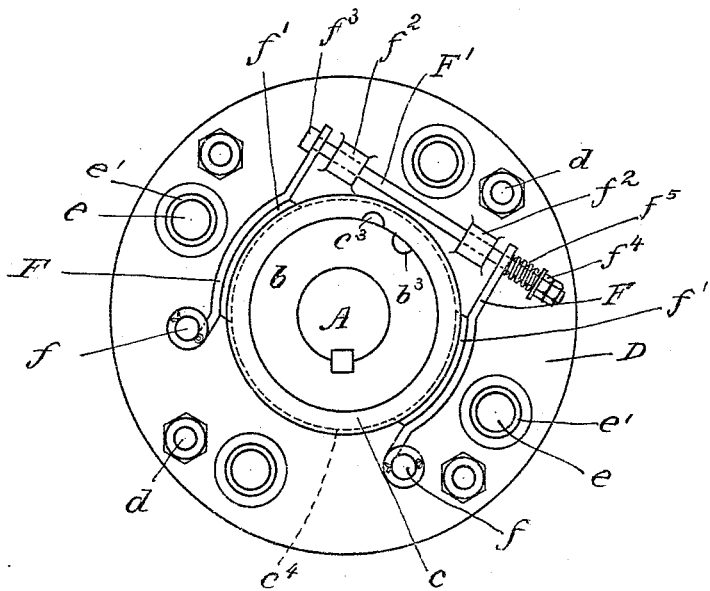
Figure 4:
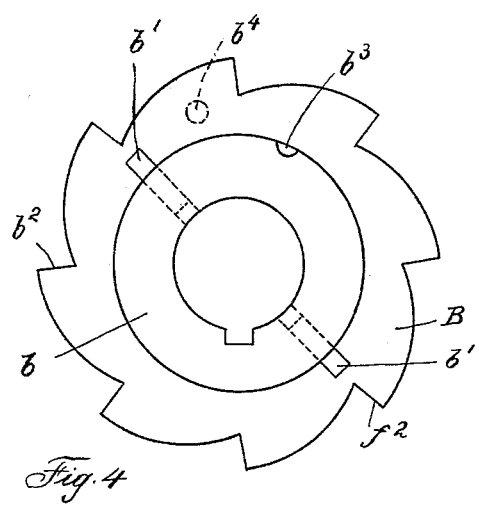
Figure 5:
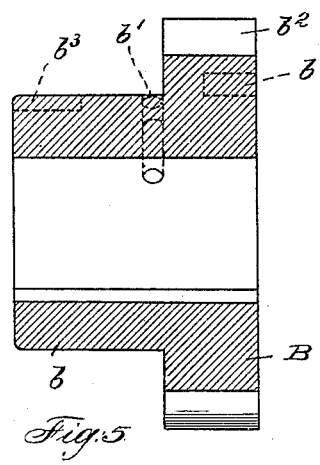
Figure 6:
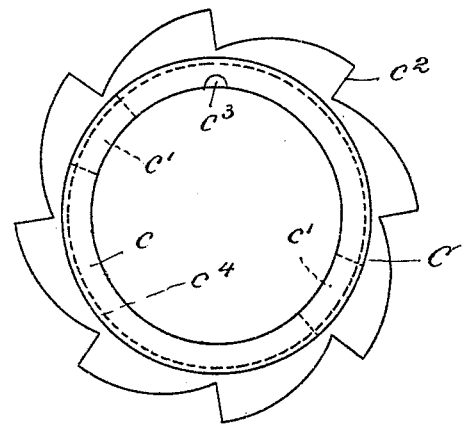
Figure 7:
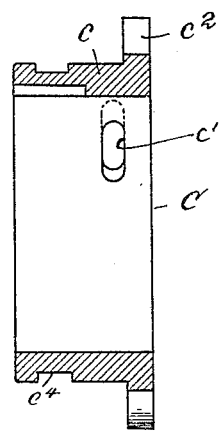
Figure 8:
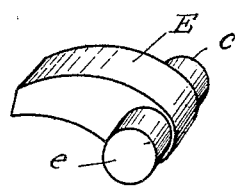
Figure 9:
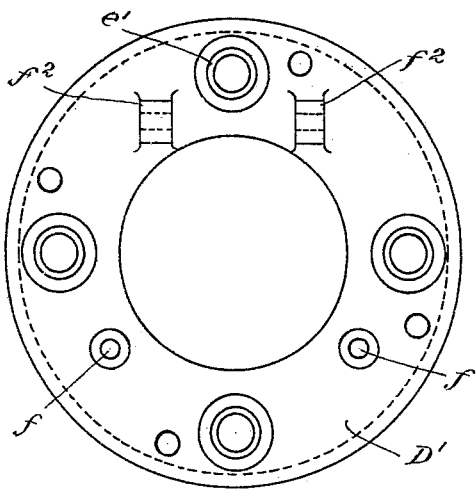
Figure 10:
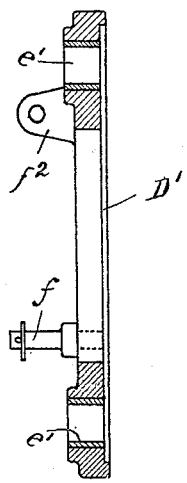

In the drawings: Figure 1 is a longitudinal section of a device embodying my invention. Fig. 2 is a section taken on line $x$—$x$ of Fig. 1, with the shaft removed. Fig. 3 is a front view of the coupling. Fig. 4 is an end elevation of the ratchet wheel. Fig. 5 is a longitudinal section thereof. Fig. 6 is an end elevation of the toothed or ratchet disk. Fig. 7 is a longitudinal section thereof. Fig. 8 is a perspective view of one of the pawls. Fig. 9 is a front elevation of the front plate of the housing. Fig. 10 is a transverse section thereof. Figs. 11 to 14 inclusive are views of the coupling illustrating the various relative movements of the shafts which are possible with the construction.

As shown in said drawings: A indicates the drive shaft and A' the alined or driven shaft upon which the coupling is mounted. Rigidly engaged upon the shaft A, flush with the end thereof, is the ratchet wheel B which is provided on the face thereof opposite from the end of the shaft with an axial hub or sleeve $b$. Adjustably engaged on said hub and partially rotatable with respect thereto is the toothed or ratchet disk C which abuts at one side against the ratchet B and on the other side is provided with a hub $c$. Said hub is provided adjacent said disk with diametrically opposite slots $c'$ which extend circumferentially of the hub and into which project pins $b'$ which are rigidly engaged in the hub $b$. Rigidly engaged on the shaft A' is a housing D which extends over said ratchet and disk and is provided with a front plate D' which is rigidly bolted thereto by means of bolts $d$, and is provided with an axial aperture through which the hubs project. Pivotally engaged in said housing are a plurality of pawls E, which as shown, are provided on one end with trunnions $e$ journaled in suitable bearings in the front and rear sides of the housing and the other ends of which are adapted to be engaged by the teeth of said disk and ratchet and lock the two shafts together when the shaft A is rotated in the direction indicated by the arrow in Fig. 11. Springs $e^2$ are rigidly engaged to the inner side of the housing and engage said pawls and force them into engagement with the teeth.

Figures 11, 12, 13, 14:
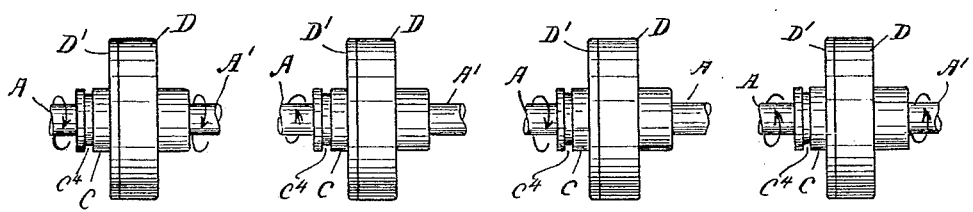

When the pins $b'$ are stationed at the ends of the slots $c'$ as shown in Fig. 2, the front faces of the teeth $b^2$ and $c^2$ of said ratchet and disk are in alinement as shown in Fig. 1, but when in engagement with the opposite ends of said slots the teeth are staggered, as shown in full and dotted lines respectively in Fig. 2. This happens when the hubs $b$ and $c$ are not locked together and the shaft A is reversed as shown in Fig. 12. In this position the teeth $b^2$ and $c^2$, which are rounded on their backs, are staggered and prevent the pawls, which are curved on their inner sides complementally with the back of the teeth, from falling into the interstices between the teeth and obviates the noise usually created upon the reversing of a ratchet. The hubs $b$ and $c$ are provided with semi-circular seats, indicated respectively by $b^3$ and $c^3$, which, when the ratchet B is in the position indicated by dotted lines in Fig. 2 with respect to the disk C, register, and by placing a pin therein the shaft A may be rotated forwardly, as shown in Fig. 13, while the shaft A' remains idle, since the pawls cannot fall in front of the teeth.

The ratchet B and the housing D are provided with apertures $b^4$ and $d'$, shown in dotted lines in Figs. 1, 4 and 5, and which register when said ratchet is in the position shown in Fig. 1. If, when in such position a pin or key be inserted in said apertures, the shafts A and A' are locked together and will rotate together when the shaft A is reversed as shown in Fig. 14.

For the purpose of preventing the disk and its hub from spinning when the shaft A is reversed, a brake is provided comprising two arms or levers F pivoted at one end on studs $f$ in the plate D' and provided with friction bearing surfaces $f'$ adjacent the hub $c$ which is provided with a groove $c^4$ to receive the same. The opposite ends of said levers are slidably engaged on a rod F' which is engaged in ears $f^2$ on said plate. Said rod is provided on one end with a head $f^3$ against which one lever engages, and between the other lever and a nut $f^4$ on the opposite end of the rod is a spring $f^5$ which, acting oppositely on the rod and lever, holds the friction faces against said hub.

The operation is as follows: When the disk C is free to partially rotate on the hub $b$, and the shaft A is rotated forwardly as shown in Fig. 11, the pawls engage in the teeth $b^2$ and $c^2$ and drive the shaft A' in the same direction. When the shaft A is reversed as indicated by the arrow in Fig. 12, the teeth $b^2$ and $c^2$ alternate and the pawls ride over said teeth but are prevented from falling into engagement with the same, thereby obviating the noise. If when in that position a pin or key be inserted in the registering seats $b^3$—$c^3$, and the shaft A is again rotated forwardly, as indicated by the arrow in Fig. 13, the shaft A' remains idle since the pawls are prevented from falling into the teeth. If it is desired to rotate both of the shafts A and A' in reverse direction, as indicated by the arrows in Fig. 14, a key or pin is placed in the apertures $b^4$—$d'$ and said shafts are thereby locked together.

Obviously a coupling embodying my invention will entirely obviate the noise usually caused by the falling of the pawls into the teeth, and obviously also the coupling is adapted to permit the maximum number of relative movements possible with a ratchet coupling. Obviously also many details of form and construction may be varied without departing from the principles of my invention.

I claim as my invention:

1. In a device of the class described the combination with a ratchet of a pawl pivoted adjacent thereto, and adapted to be engaged by the ratchet teeth when the latter are rotated in one direction, and means adjustably engaged on said ratchet having projections adapted to automatically alternate with said teeth and prevent the latter from engaging the pawl when the ratchet is reversed.

2. In a device of the class described the combination with a ratchet, of a toothed member adjacent thereto, coacting means on said ratchet and member permitting a limited free movement of one with respect to the other, means for locking said member and ratchet together with their teeth arranged staggering when at one limit of said movement, and a pawl pivoted adjacent said teeth.

3. In a device of the class described the combination with a ratchet of a pawl pivoted adjacent thereto and adapted to be engaged by the ratchet teeth, a toothed member adjacent said ratchet, a pin and slot connection between the ratchet and member adapting said ratchet to partially rotate with respect to said member, and means for locking said ratchet and member together at one limit of such movement with their teeth alternating.

4. In a device of the class described the combination with a ratchet of a pawl adapted to engage the teeth thereof, a toothed disk adjacent said ratchet and means connecting said ratchet and disk adapting said ratchet to be partially rotated with respect to the disk and prevent the pawl from entering any of the ratchet teeth.

5. In a device of the class described the combination with a ratchet having a hub thereon, of a toothed disk mounted on said hub and adapted to normally, partially rotate thereon, means adapted to lock the disk on the hub with its teeth alternating with the teeth of the ratchet, a housing inclosing said disk and ratchet, and a pawl pivoted therein adjacent to the ratchet.

6. In a coupling the combination with a housing of a pawl pivoted therein, a ratchet in said housing, and a toothed disk adjacent said ratchet adapted when the ratchet is rotated in one direction to have its teeth coincide with those of the ratchet and when the ratchet is rotated oppositely to have its teeth staggered with the ratchet teeth and prevent the pawl from entering the same.

7. In a device of the class described the combination with a housing of a ratchet therein, a pawl pivoted in the housing and adapted to engage the ratchet teeth, adjustable means adjacent said ratchet adapted to hold the pawl out of engagement with the teeth, and a brake for said means.

8. In a device of the class described the combination with alined shafts of a ratchet on one of the same, a pawl carried on the other, a toothed disk mounted on the ratchet, means normally permitting partial free rotation of the ratchet with respect to said disk, and means adapted to lock said disk to the ratchet and prevent the pawl from entering the ratchet teeth.

9. The combination with alined shafts of a housing on one of the same, a ratchet on the other in said housing, a pawl in the housing adapted to engage the ratchet teeth, a toothed disk adjacent said ratchet and adapted when in one position to hold the pawl out of engagement with the ratchet teeth, means for locking said disk in such position and a friction brake for said disk.

10. The combination with alined shafts of a housing on one of the same, a ratchet on the other in said housing and having a laterally directed hub, a toothed disk adjacent said ratchet and having a hub inclosing the ratchet hub, a pin and slot connection between hubs, a brake for said disk and a pawl pivoted in the housing and adapted to coact with the ratchet teeth.

11. The combination with alined shafts of a housing on one of the same, a ratchet on the other, a pawl in the housing adapted to engage said ratchet, a toothed disk mounted on the ratchet, there being key seats in said disk and ratchet adapted to register when the teeth of the disk and ratchet are staggered, a pin and slot connection between said disk and ratchet and a brake for said disk.

In testimony whereof I have hereunto subscribed my name in the presence of two witnesses.

RUDOLPH HEINRICH DANZINGER.

Witnesses:
JOHANNES SCHULTE,
ROBT. KLOTZ.